(12) United States Patent
Beebe et al.

(10) Patent No.: US 6,915,684 B2
(45) Date of Patent: Jul. 12, 2005

(54) TIRE UNIFORMITY TESTING

(75) Inventors: James Beebe, Kent, OH (US); Barry Cargould, Hudson, OH (US); Richard Matuszny, Parma, OH (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/417,291

(22) Filed: Apr. 16, 2003

(65) Prior Publication Data

US 2003/0196483 A1 Oct. 23, 2003

Related U.S. Application Data

(60) Provisional application No. 60/374,793, filed on Apr. 22, 2002.

(51) Int. Cl.[7] .............................................. E01C 23/00
(52) U.S. Cl. ....................................................... 73/146
(58) Field of Search ................................ 73/146–146.8; 340/440–444; 157/13–21

(56) References Cited

U.S. PATENT DOCUMENTS

| | | |
|---|---|---|
| 3,752,207 A | 8/1973 | Branham et al. |
| 3,844,048 A | 10/1974 | Branham et al. |
| 3,869,908 A | 3/1975 | Driendl |
| 4,479,381 A | 10/1984 | Kounkel et al. |
| 4,704,900 A * | 11/1987 | Beebe .......................... 73/146 |
| 4,805,125 A | 2/1989 | Beebe |
| 4,914,869 A * | 4/1990 | Bayonnet et al. ............... 451/5 |
| 5,027,649 A * | 7/1991 | Himmler ...................... 73/146 |
| 5,029,467 A * | 7/1991 | Cargould ..................... 73/146 |
| 5,052,218 A * | 10/1991 | Iwama ......................... 73/146 |
| 5,067,348 A * | 11/1991 | Himmler et al. .............. 73/460 |
| 5,481,907 A * | 1/1996 | Chasco et al. ................ 73/146 |
| 5,979,231 A | 11/1999 | Lees, Sr. et al. |
| 5,992,227 A | 11/1999 | Jellison et al. |
| 6,016,695 A | 1/2000 | Reynolds et al. |
| 6,082,191 A * | 7/2000 | Neiferd et al. ................ 73/146 |
| 6,492,804 B2 * | 12/2002 | Tsuge et al. ................. 324/166 |
| 6,546,635 B1 * | 4/2003 | Gerdes ..................... 33/203.13 |

* cited by examiner

*Primary Examiner*—William Oen
*Assistant Examiner*—Jermaine Jenkins
(74) *Attorney, Agent, or Firm*—Watts Hoffmann Co. LPA

(57) ABSTRACT

A method and apparatus for testing tires in a repeatable manner. Testing steps are performed in a manner that minimizes impact on the tire characteristics being measured. In one aspect, tire rotation reversal is performed at a zero crossing of a first harmonic of radial load variation exerted on a load carriage by the tire. In another aspect, load carriage retraction is performed so that the tire is unloaded when the tire stops rotating.

10 Claims, 2 Drawing Sheets

TIRE UNIFORMITY TESTING

CROSS-REFERENCE TO RELATED APPLICATION

This Application claims benefit of 60/374,793 filed on Apr. 22, 2002.

TECHNICAL FIELD

The invention relates to the field of tire uniformity testing machines and, in particular, to a technique for improving the repeatability of uniformity testing machines.

BACKGROUND ART

An established part of the manufacture of tires is testing the tires for uniformity. After the tires have been manufactured, they are routed to a uniformity measuring machine. One example of a tire uniformity testing machine is described in U.S. Pat. No. 6,016,695, "Tire Uniformity Testing System", which is incorporated herein by reference. A typical uniformity machine will automatically convey the tire into the machine, chuck it between two half-rims, inflate it, load it against a drum to simulate the weight of a vehicle, proceed with steps to test it, then mark the tire and sort the tire into one of several output conveyors. Loadwheel assemblies found in currently available uniformity testing machines are described in U.S. Pat. No. 5,979,231 "Loadwheel Assembly for Tire Testing Systems Having Conical Support Plates", and U.S. Pat. No. 4,704,900 "Apparatus and Method for Imposing a Desired Average Radial Force on a Tire", both of which are incorporated herein by reference. Some uniformity machines perform additional steps, such as grinding the tire to improve its characteristics and measuring geometric parameters of the tire.

The testing steps on a typical uniformity machine consist of rotating the loaded, inflated tire, measuring the forces exerted by the tire on the drum as a function of the rotational position of the tire, performing calculations on those measurements to obtain measurements of the characteristics of the tire, reversing the rotation of the tire (a description of a spindle assembly that is used to mount and rotate the tire during testing is found in U.S. Pat. No. 5,992,227 "Automatic Adjustable Width Chuck Apparatus for Tire Testing Systems" which is incorporated herein by reference), repeating the measurement process, comparing the measurements of the characteristics in one or both directions to preset limits to obtain grades for the tire's uniformity and determining the output conveyor for further processing, placing these grading and sorting results into memory for later use in marking and sorting, and stopping the rotation at the correct orientation so that a mark can be placed at a required angular location on the tire, usually corresponding to the high point of the first harmonic of radial force variation.

One common measure of the quality of a uniformity machine is its repeatability, how well the measurements of the tire characteristics repeat when tires are tested multiple times. Lack of repeatability can be caused by many sources on a machine, such as poor control of the test conditions of load and inflation, excessive runout in the test rims or loading drum, electrical noise, mechanical vibrations, etc. Because repeatability is such an important measure of a machine's quality, much attention has been focused into obtaining good repeatability over the years.

It has long been known that certain types of tire construction can lead to poor repeatability when tires of these types are used in the measurement of the repeatability of a uniformity machine. For instance, the use of nylon as a reinforcement material in the tire often leads to poor repeatability. Unfortunately, in recent years, more tires are being constructed in designs which cause poor repeatability, due to the increasing emphasis on the reliability of tires through the use of components such as belt edge overlays, and the increasing importance of high speed rated tires, which very frequently use a nylon cap ply. The increasing prevalence of these difficult tires presents a problem for the manufacturer of tire uniformity measuring machines. The machines continue to be of the same high quality as in years past (or even of improved quality), but the measurement of their repeatability with test tires indicates that the machine's quality is not up to standard.

Furthermore, the measurement of these difficult tires presents a problem for tire manufacturers. If there is a large uncertainty in the measurement of their characteristic (at least when measured with a commercially viable cycle time), the tire manufacturer cannot reliably grade the tire into the correct category, resulting in possibly dissatisfied customers or lost revenue due to downgrading a tire unnecessarily.

SUMMARY OF THE INVENTION

Performing test steps in a manner that minimizes impact on tire characteristics being measured enhances the repeatability of tire testing. The invention provides a method an apparatus for testing a tire in a repeatable manner. The tire is mounted on a rotatable spindle and rotated. During rotation, one or more tire parameters is measured as a function of the tire's rotational position. A tire position at which to perform a subsequent test step is determined based on the measured parameters. The subsequent test step is then performed at the determined position.

In one aspect of the invention, tire reversal is performed at a tire position that will minimize the set taken by the tire during reversal. The radial force that is exerted on a load carriage during testing is measured and the variation of that force is recorded. A first harmonic of the radial force variation is calculated and the reversal is performed at a zero crossing of the first harmonic.

In another aspect of the invention, the load from the load carriage is removed prior to or simultaneously with the tire rotation being stopped. A desired tire stop position and a retraction distance that will be traveled by the load carriage to unload the tire are determined. The retraction time required for the load carriage to move the retraction distance as well as the angle of rotation that will occur during the retraction time are calculated. From this information a tire retraction position at which retraction must begin such that the load carriage will complete retraction at the desired tire stop position is deduced. Load carriage retraction is then begun at the tire retraction position.

Other features, benefits and advantages of the invention will be apparent from the following detailed description of preferred embodiments thereof taken in conjunction with the following drawing figures.

DETAILED DESCRIPTION OF THE PREFERRED EMBODIMENTS

One cause of reduced repeatability in uniformity testing machines is that when the direction of rotation of the tire is reversed under load, the tire takes a "set" during this reversal, and this "set" affects the measurements made in the second direction of rotation, especially the measurement of radial force variations. It is believed that this effect is predictable based on the angular position of the tire at which reversal occurs, ranging from an increase in radial force variation, through little change, to a decrease in radial force variation. Since the radial forces in the two directions of rotation show a high degree of similarity, it is possible to control the reversal based on measurements made in the first direction such that little change in radial forces in the second direction occurs. This allows the machine to provide the true measure of the radial forces in the second direction, on a very repeatable basis.

Figure 1:
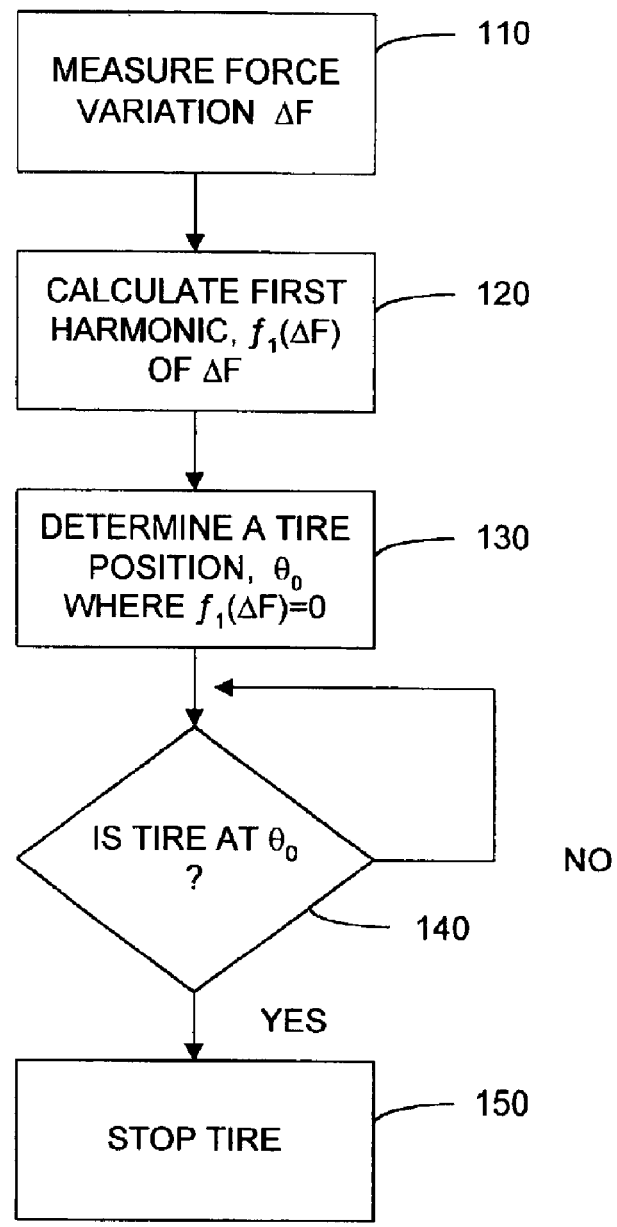
FIG. 1 is a flowchart representation of a method for operating a tire uniformity testing machine in accordance with an embodiment of the present invention; and, FIG. 2 is a flowchart representation of a method for operating a tire uniformity testing machine in accordance with an embodiment of the present invention.

According to a preferred embodiment, the uniformity machine is operated according to the steps outlined in FIG. 1. In step 110, the radial force variation is measured in the current direction of rotation. The first harmonic of this force variation is calculated in step 120 and a tire position corresponding to either zero crossing of the first harmonic is determined in step 130. In step 140, the tire position is monitored until a zero crossing is reached. The rotation direction is reversed at the appropriate location in step 150 and the test is continued.

While this technique will cause a slight increase in the cycle time due to delaying the reversal, this increase is more than made up for by allowing the "warmup" in the second direction to be reduced.

Another cause of tire-related nonrepeatability is the common practice of stopping the rotation of the tire to allow for marking, either inside the test zone, or especially, in a following station of the machine. This also causes the tire to take a "set", one which will remain even after the tire is brought back to the entrance of the machine to be retested as part of a repeatability test. While it may appear that this is less of a problem to tire manufacturers in terms of their processing of the tire, since all grading decisions have already been made at this time, in many cases, the process flow causes the tire to be routed next to a balance measuring machine [such as an AIT-238 made by ITW Ride Quality Products], where the "set" of the tire may cause incorrect balance measurements and subsequent grading decisions to be made.

Figure 2:
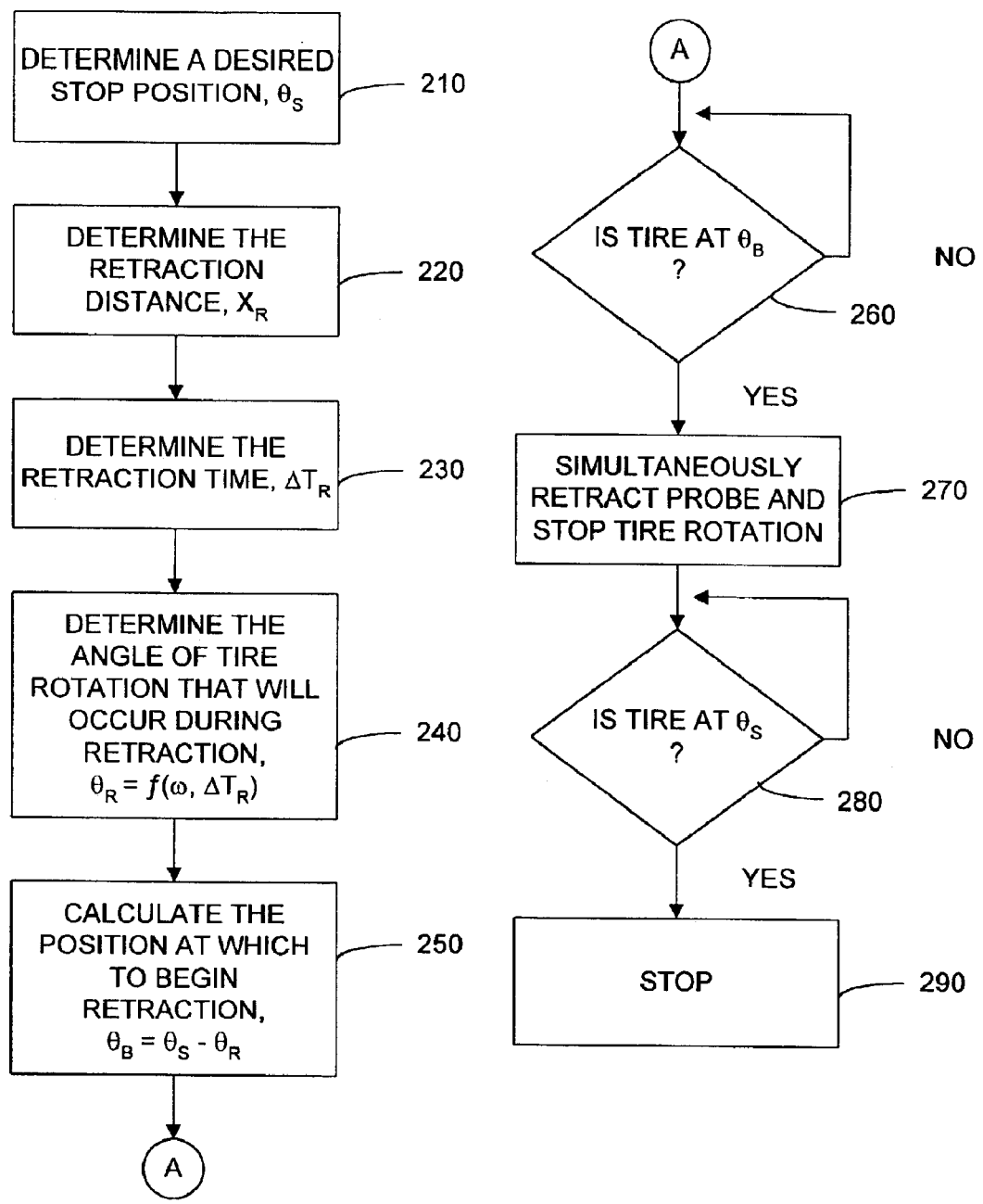

This cause can be overcome by advancing the unloading of the tire so that the load on the tire is removed by the time that the tire is stopped. Those skilled in the art of controlling uniformity machines will understand several ways to implement this control. In this described embodiment, the tire uniformity machine is operated according to a method consisting of the steps outlined in FIG. 2 is used. A desired stop position is identified in step 210. The distance the loadwheel will need to retract to clear the tire is determined in step 220, based on a measurement of the outside radius of the tire made when the tire was loaded.

From this distance and the known rate of motion of the loadwheel carriage, the time needed to retract this distance is calculated in step 230. An angle of tire rotation that will occur during the retraction time is determined in step 240 and a position at which retraction should begin is deduced in step 250. When the tire is in an orientation from which it can be stopped in the time determined in the previous step and result in the tire stopped at the desired location, the loadwheel retract and the stopping of the tire spindle are simultaneously commenced. This causes the loadwheel to release contact with the tire just as the spindle stops (steps 260–290).

As can be seen from the foregoing description, by handling the tire during testing in a manner that minimizes the effects of the testing apparatus on the tire's uniformity characteristics, a more repeatable uniformity test can be performed. Although the present invention has been described with a degree of particularity, it is the intent that the invention include all modifications and alterations from the disclosed design falling within the spirit or scope of the appended claims.

We claim:

1. A method for testing a tire comprising the steps of:
   mounting the tire on a rotatable spindle;
   rotating the tire in a first rotation direction and measuring one or more tire parameters as a function of the tires rotational position;
   determining a tire rotational position at which to reverse the rotation of the tire based on the measured parameters; and
   reversing the rotation direction when the tire reaches the determined rotational position.

2. The method of claim 1 wherein the measured parameter comprises a radial force variation.

3. The method of claim 2 comprising the step of calculating a first harmonic of the radial force variation and wherein the step of reversing the tire rotation direction is performed based on the calculated first harmonic.

4. The method of claim 3 wherein the step of reversing the tire rotation direction is performed at a positive-going zero crossing of the first harmonic of radial force variation.

5. The method of claim 3 wherein the step of reversing the tire rotation direction is performed at a negative-going zero crossing of the first harmonic of radial force variation.

6. The method of claim 3 wherein the step of reversing the tire rotation direction is performed at a first encountered zero crossing of the first harmonic of radial force variation.

7. A method for testing a tire comprising the steps of:
   mounting the tire on a rotatable spindle;
   applying a load to a tire perimeter with a moveable load carriage by moving the load carriage into contact with the tire perimeter;
   rotating the tire and measuring one or more tire parameters as a function of the tire's rotational position;
   determining a desired tire stop position;
   determining a retraction distance that will be traveled by the load carriage to unload the tire;
   determining a retraction time required for the load carriage to move the retraction distance;
   calculating an angle of rotation that will occur during the retraction time;
   deducing a tire retraction position at which retraction must begin such that the load carriage will complete retraction at the desired tire stop position; and
   beginning load carriage retraction at the tire retraction position.

8. An apparatus for testing a tire comprising:
   a rotatable spindle for rotating a tire to be tested in a first direction;
   a load carriage movable along a retraction axis perpendicular to the spindle for contacting the tire being tested, applying a load to the tire, and measuring tire parameters;

load cells mounted on the load carriage for measuring radial forces exerted on the load carriage by the tire; and a controller for recording the measured tire parameters as a function of tire rotational position, calculating a first harmonic of radial force variation as a function of tire rotational position, and determining a tire rotational position at which to reverse the rotation direction based on the calculated first harmonic.

9. The apparatus of claim 8 wherein the controller causes tire rotation reversal to occur at a zero crossing of the first harmonic of radial force.

10. An apparatus for testing a tire comprising:

a rotatable spindle for rotating a tire to be tested in a first direction;

a load carriage movable along a retraction axis perpendicular to the spindle for contacting the tire being tested, applying a load to the tire, and measuring tire parameters;

load cells mounted on the load carriage for measuring radial forces exerted on the load carriage by the tire; and a controller for recording the measured tire parameters as a function of tire rotational position, determining a desired tire stop position based on the measured parameters; determining a retraction distance that will be traveled by the load carriage to unload the tire; determining a retraction time required for the load carriage to move the retraction distance; calculating an angle of rotation that will occur during the retraction time; and deducing a tire retraction position at which retraction must begin such that the load carriage will complete retraction at the desired tire stop position; wherein the controller causes the load carriage to retract at the same time the tire rotation is stopped by beginning load carriage retraction at the tire retraction position.

* * * * *